Jan. 8, 1924.
C. C. SMITH
1,480,021
BELT PULLEY CLUTCH CONTROL FOR TRACTORS
Filed Feb. 20, 1922
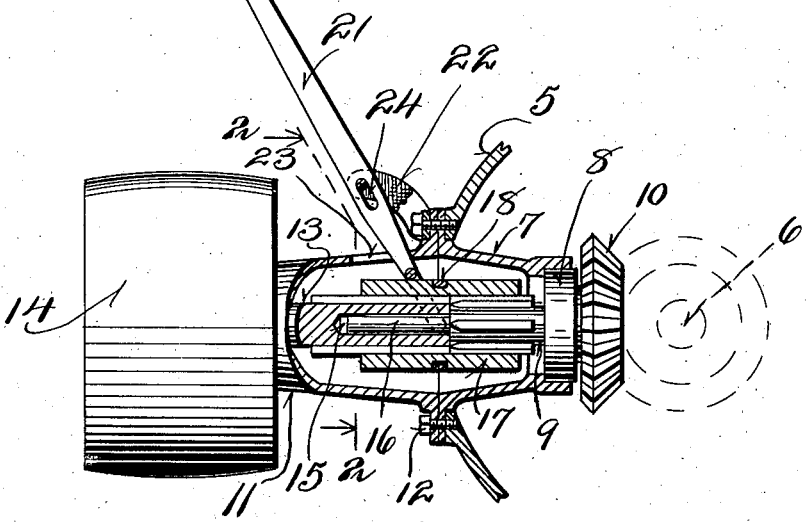
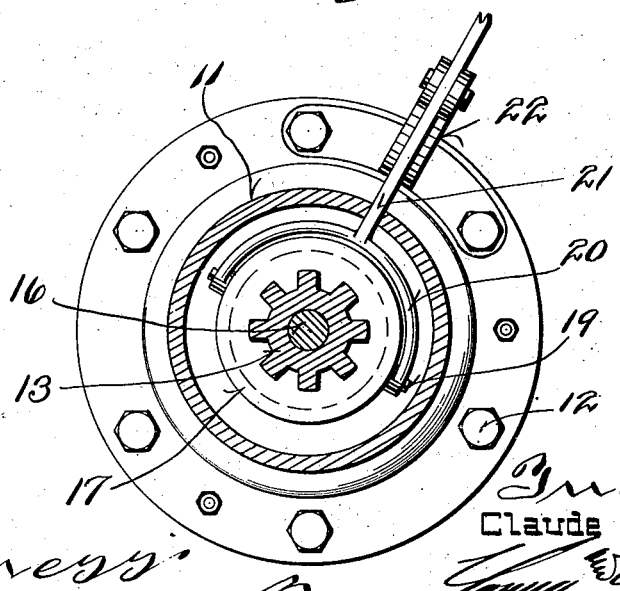

Patented Jan. 8, 1924.

1,480,021

UNITED STATES PATENT OFFICE.

CLAUDE C. SMITH, OF NORTH LAKE, WISCONSIN, ASSIGNOR TO DALLMAN MACHINE AND MANUFACTURING COMPANY, OF MILWAUKEE, WISCONSIN.

BELT-PULLEY CLUTCH CONTROL FOR TRACTORS.

Application filed February 20, 1922. Serial No. 537,749.

*To all whom it may concern:*

Be it known that I, CLAUDE C. SMITH, a citizen of the United States, and resident of North Lake, in the county of Waukesha and State of Wisconsin, have invented certain new and useful Improvements in Belt-Pulley Clutch Controls for Tractors; and I do hereby declare that the following is a full, clear, and exact description thereof.

My invention relates to a belt pulley clutch control, which is more specially adapted for connecting the power shaft of a tractor with the pulley shaft by means of which the power from the tractor engine is used for operating stationary machinery.

The general object of the invention is to provide an improved construction by means of which such pulley shaft may be selectively connected to the power shaft of the engine, while the latter is continuously driven.

The invention consists further in certain structural details and combinations, which will be apparent from the following description taken in connection with the claim hereunto appended.

In the accompanying drawing:—

Figure 1 represents a longitudinal sectinal view of the invention, and

Figure 2 represents a cross sectional view on the line 2—2 of Figure 1.

Referring more specifically to the drawing, the numeral 5 designates a housing which surrounds the main power shaft 6 of the tractor. This housing is provided at one side with an opening in which is secured an inwardly extending bearing member 7, which is formed at its inner end with a journal for receiving the bearing collar 8, which is secured to a shaft 9 which has a constant driving connection with the shaft 6 through the medium of the beveled gear 10. A complementary housing and bearing member 11 is secured to the member 7 by means of screws 12, or the like, and forms at its outer end a journal bearing for the driven shaft 13 which carries the pulley 14. This shaft 13 is journalled in alinement with the shaft 9 and is provided at its inner end with a central bore 15 which revolubly receives the reduced end 16 of the shaft 9, thus maintaining the two shafts in alinement. A sleeve 17 is permanently splined to the shaft 13 and may be selectively moved longitudinally into splined engagement with the shaft 9, as shown in Figure 1. For the purpose of controlling this movement, a collar 18 is revolubly mounted centrally of the sleeve and is provided with oppositely disposed trunnions 19 to which are connected the arms of a yoke 20 formed on the inner end of a lever 21. This lever is fulcrumed on a bracket 22 which is secured to the housing and a slot 23 may be provided in the bearing member 11 through which the lever may project. A slotted connection 24 is provided between the lever and this fulcrum in order to compensate for the change in radius as the lever is actuated to shift the sleeve.

It is to be noted that a single bearing is provided by the housing for each of the shafts 9 and 13 and that a common central bearing or support for the juxtaposed ends of the shafts is secured by the reduced extension 16 and the bored out portion 15, and by the sleeve 17 which overlaps both shafts when the clutch is closed. This in effect constitutes a double joint when power is being transmitted, that is to say, when the shafts are subjected to maximum distorting or deflecting stresses. This construction dispenses with two extra bearings at the adjacent or inner ends of the shafts.

It is further to be noted that the splined connection between the shaft 13 and the collar 17 is of sufficient extent to permit the sleeve 17 to be moved to the left, (Fig. 1) sufficiently to completely clear the splined portion of the shaft 9. Thus, when the clutch is open both the sleeve 17 and shaft 13 are still, and no wear results between the shaft 13 and the sleeve or between the sleeve and the collar 18. In tractors this condition is desirable as there are long periods during which the engine is operating the tractor and the pulley 14 is stationary.

It is to be further noted that when the shaft 9 is running unloaded, that is to say the clutch is open, there are no appreciable distorting forces either from the thrust of the gears or the torque of the shaft 9. Under these conditions the reduced extension 16 and the co-operating cavity constitute a sufficiently strong and free support for the shafts thereby mimizing friction and wear. When however, the pulley 14 is driving a belt, maximum stresses are placed upon the shafts. However, the sleeve 17 connects the shafts and thus, with the extension 16, constitutes a double support or joint between the shafts.

From the foregoing description, it will be seen that I have provided a convenient and practical means for selectively connecting the pulley shaft with the engine independent of the engine clutch, and while the engine is running.

It will be understood, also that while I have shown and described specifically one embodiment of my invention, various modifications may be made in the precise structural details thereof without departing from its scope as claimed.

I claim:—

In a tractor the combination of an enclosing housing having an aperture therethrough, an auxiliary housing having complementary inner and outer portions provided with flanges positioned adjacent said first mentioned housing with the inner of the portions of said auxiliary housing projecting into said first mentioned housing, fastening means passing through said flanges and into said first mentioned housing, a bearing carried by the inner end of said inner portion, a driving shaft carried in said bearing, the outer of said portions having a bearing at its outer end, a driven shaft carried in said last mentioned bearing, projecting inwardly and outwardly from said bearing, aligning with said driving shaft and having its inner end located closely adjacent the outer end of said driving shaft, a pulley carried by the outwardly projecting portion of said driven shaft closely adjacent said last mentioned bearing, and a slidable sleeve having splined connection with the adjacent ends of each shaft.

In testimony that I claim the foregoing I have hereunto set my hand at Milwaukee, in the county of Milwaukee and State of Wisconsin.

CLAUDE C. SMITH.